United States Patent [19]

Vasudevan

[11] Patent Number: 5,377,323
[45] Date of Patent: Dec. 27, 1994

[54] APPARATUS AND METHOD FOR A FEDERATED NAMING SYSTEM WHICH CAN RESOLVE A COMPOSITE NAME COMPOSED OF NAMES FROM ANY NUMBER OF DISPARATE NAMING SYSTEMS

[75] Inventor: Rangaswamy Vasudevan, Sunnyvale, Calif.

[73] Assignee: Sun Microsytems, Inc., Mountain View, Calif.

[21] Appl. No.: 760,044

[22] Filed: Sep. 13, 1991

[51] Int. Cl.$^5$ .......................................... G06F 13/00
[52] U.S. Cl. .................................. 395/200; 395/600; 395/325; 364/284.3; 364/284.4; 364/DIG. 1
[58] Field of Search .............. 395/600, 200, 325; 380/23; 364/419.08

[56] References Cited

U.S. PATENT DOCUMENTS 4,435,769  3/1984  Nagano et al. .................... 364/464
4,912,637  3/1990  Sheedy et al. ..................... 364/300
5,136,716  8/1992  Harvey et al. ..................... 395/800
5,187,787  2/1993  Skeen et al. ....................... 395/600
5,224,163  6/1993  Gasser et al. ....................... 380/30
5,239,577  8/1993  Bates et al. ......................... 379/201

OTHER PUBLICATIONS

Honeyman et al., "Parsing Ambiguous Addresses for Electronic Services", *Software-Practice and Experience*, vol. 17, No. 1, pp. 51–60 (Jan., 1987).

Primary Examiner—Thomas C. Lee
Assistant Examiner—Paul Lintz
Attorney, Agent, or Firm—Erwin J. Basinski

[57] ABSTRACT

In a distributed computing environment, an apparatus and method for a federated Naming System which can resolve Composite Names comprised of Names from an arbitrary number of disparate Naming Systems. A syntax for Composite Names is defined as well as necessary operations to directly resolve such Composite Names without the need for customized agents or gateways.

9 Claims, 6 Drawing Sheets

APPARATUS AND METHOD FOR A FEDERATED NAMING SYSTEM WHICH CAN RESOLVE A COMPOSITE NAME COMPOSED OF NAMES FROM ANY NUMBER OF DISPARATE NAMING SYSTEMS

BACKGROUND OF THE INVENTION

1. Technical Field

This invention relates to Object-Based Distributed Computing Systems, and more particularly to the field of naming systems.

2. Description of Related Art and Background

A portion of the disclosure of this patent document contains material which is subject to Copyright protection. The Copyright owner has no objection to the facsimile reproduction by anyone of the patent disclosure itself, as it appears in the Patent and Trademark Office patent files and records, but otherwise reserves all Copyright rights whatsoever, including specifically all rights to any other copies of all or part of any computer programs which may be disclosed herein.

A fundamental facility in any computing system is the Naming Service (the "Naming Service"). A Naming Service is the means by which names are associated with objects, and by which objects are found given only their names. A Name ("Name") is a sequence of one or more atomic names, where an atomic name ("Atomic Name") is a name defined by a naming convention which, for example, may be a sequence of one or more characters. For example, "user/John. Smith/foo" is a Name and "user", "John. Smith", and "foo" are Atomic Names. An object ("Object") is generally a combination of data and operators or operational routines related to that data. Naming Services usually provide operations for associating, or binding, names to objects
  finding the objects bound to given names
  removing name association or bindings
  querying, renaming, etc.

In early versions of computing systems, the naming schemes used were not the result of well defined naming services but rather an incidental set of rules for naming things created by the system designer. Over the past decade more systematic and formal approaches to the development of computer systems designs have led to the creation of discrete or standalone computer services such as file systems, directory services, databases, etc. Each of these services, in many cases, have created their own set of rules for naming Objects within the service, and for use by clients.

Most of the early Naming Services did not communicate with each other. Clients had to use the services separately. In those rare cases where such services had to be used together, communication was by means of a "Composite Name". A "Composite Name" is a sequence of names from more than one Naming System. In today's UNIX® systems (UNIX is a registered trademark of UNIX Systems Laboratories, Inc., a wholly-owned subsidiary of Novell, Inc., certain applications, such as "mount" and "rcp", implement resolution of Composite Names with components from different naming systems. To do this, these applications may use a special delimiter character to separate Names in the Composite Name, enabling them to resolve the Composite Name to the corresponding Object by using each component naming system. Unfortunately, the use of such Composite Names is limited to the small set of applications that are able to resolve them. Also, such applications are typically restricted to only a small and fixed number of Naming Systems. Adding a new type of Naming System would require all of the applications to be changed.

A serious problem with the use of Composite Names today is the lack of uniformity and transparency. The user must be aware of which commands accept Composite Names, and their required syntax. For example, the composite name "sylvan:/temp/foo" is acceptable to the UNIX command "rcp", but it is not accepted by the command "cp".

More recently, the increased use of computers in business and at home, due to reduced costs and increased computer literacy, has led to increased demand for access between computer systems. Portable computers allow users to move them freely about the world but these users continue to require constant access to their host applications, files, databases and electronic mail via connections to other computer systems. New networks of computers require more access to more and more disparate networks and related systems. These increasing demands have produced the present focus on Distributed Computer Systems and on methods to interoperate these systems. This focus on interoperability is on developing means for easy access from one computing system to another, regardless of whether the two systems have different naming systems, different operating systems, different file systems, different databases, etc., with minimal cost of modifying any system to interoperate with another.

Moreover, widespread deployment of fiberoptic communication lines, together with high speed packet-switching technologies, are greatly increasing the capacity and performance of wide-area networks. These advances, coupled with new object-based technologies, create a tremendous need for systems and methods which will allow systems to communicate with each other efficiently.

A major stumbling block in developing such easy access between systems is the disparate naming conventions and naming operations used by the various individual file systems, databases, operating systems, communications systems, etc.

Several approaches have been and are being developed to address this problem of dealing with disparate naming systems. An approach for handling Composite Names is provided by the Open Software Foundation TM /Distributed Computing Environment (the "OSF/DCE"). Open Software Foundation ("OSF") is a trademark of Open Software Foundation, Inc.

The OSF/DCE approach to this problem of handling the existing disparate naming systems is through the use of Composite Names.

OSF/DCE provides a method of handling composite names composed of three levels of naming systems: 1) the global directory service, either CCITT's X.500 or Internet's Domain Naming Service ("DNS") that names cells; 2) the OSF/DCE Cell Directory Service "CDS") that names users, file servers, databases, and other servers in a cell; and 3) the naming system of OSF's Distributed File System ("DFS") and other services named by CDS.

For example, the following is a Composite Name handled by OSF/DCE,

"/.../C=US/O=OSF/OU=Cambridge/fs/user/-John.Smith/foo"

where
/ = name of the local computer host's root
... = name of the global root
C=US/O=OSF/OU=Cambridge=X.500 name of a cell root
fs=CDS name of the DFS root
user/John.Smith/foo=DFS UNIX file name.

This approach of OSF/DCE permits Composite Names spanning two or three Naming Systems (three in the above example), and provides a significant advance in handling disparate Naming Systems. However, this approach uses agents that are customized to specific naming systems. This method lacks the flexibility and scaiability that will be required by Object-Based distributed systems in the future. A change to one of OSF/DCE's Naming Systems, or the addition of a new type of Naming System requires changes to existing agents or the addition of a new customized agent. Also, the future need will be to support Composite Names that span an arbitrary number of Naming Systems, not just a fixed number such as two or three Naming Systems.

At present, the development of Object-Based Distributed Systems has just begun and the expected proliferation of such systems and the corresponding increase in the number and type of "Objects" requiring "Names" and Name resolution makes the development of efficient and flexible Naming Systems of paramount importance.

Accordingly, the present invention defines a model which can describe any Naming System and its related characteristics, defines a method of federating an arbitrary number of disparate Naming Systems with minimal computing cost and effort to participate in the federation, and defines an apparatus and method for using this federated Naming System to perform the functions of name resolution in an Object-Based Distributed Computing Environment. It is noted that existing Naming Systems which are not Object-Based may be able to participate in a federated system such as is disclosed herein, but only at some expense through the use of customized gateways.

The prior art does not define Naming Systems for Composite Name resolution in a federation of an arbitrary number of disparate Naming Systems.

SUMMARY OF THE INVENTION

Goals of the present invention are to:

Provide Clients with a single uniform Composite Name resolution interface to a Federated Naming System;

Allow an autonomous Naming System to participate in the federation with minimal cost and effort and with no impact on existing Naming Systems;

Provide a system which allows the addition of new services with their own Naming Systems without requiring changes to Clients or to other existing Naming Systems in the Federation;

Provide a system which does not require intermediate customized Gateways or customized Agents to assist in the resolution of Composite Names, thereby resulting in better performance and fewer fault tolerance issues.

To accomplish these goals, the invention provides, in a distributed computing environment, an apparatus and method for a Federated Naming System which can resolve Composite Names comprised of Names from an arbitrary number of disparate Naming Systems, In order to join in a federation of Naming Systems, the individual Naming Systems are required to have within their systems the means for separating a Name into a "head" Name component and a "tail" Name component as defined herein. The method for doing this resolution internally is left to the individual Naming System. Given however, that the individual Naming System has the required parsing methods, they may then join in the specified federation by implementing a federation syntax for Composite Names, and by implementing a Composite Name Lookup operation at a minimum. The invention specifies a method and apparatus for implementing such a federation of Naming Systems and for resolving Federation Composite Names.

With this apparatus and method, systems with disparate Naming Systems may easily federate to provide their individual clients with efficient resolution of Composite Names of Objects located in other systems.

DETAILED DESCRIPTION OF THE INVENTION

An Apparatus and Method are disclosed which provides an efficient name resolution system for a federation of any number of disparate Naming Systems in an Object-Based Distributed Computing Environment. A model of a Naming System is described which can define the characteristics of any Naming System. Within the context of this Naming System model, a method for federating any number of disparate Naming Systems is described, including an apparatus and method for name resolution of a Composite Name composed of any number of such discrete Naming Systems.

NAMING MODEL

The following object-based model defines Naming Systems in abstract terms.

A "Name" is a sequence of one or more atomic names.

An "Atomic Name" is a value specified by a naming convention, which, for example, could be a sequence of one or more characters. Every Name is defined by a "Naming Convention" which is a set of syntactic rules which govern the form of a Name. A naming convention defines all possible Atomic Names and enables the definition of operations for parsing any Name to produce its sequence of Atomic Names. The naming convention also enables the definition of a relation for determining if two Names are equivalent.

Figure 4:
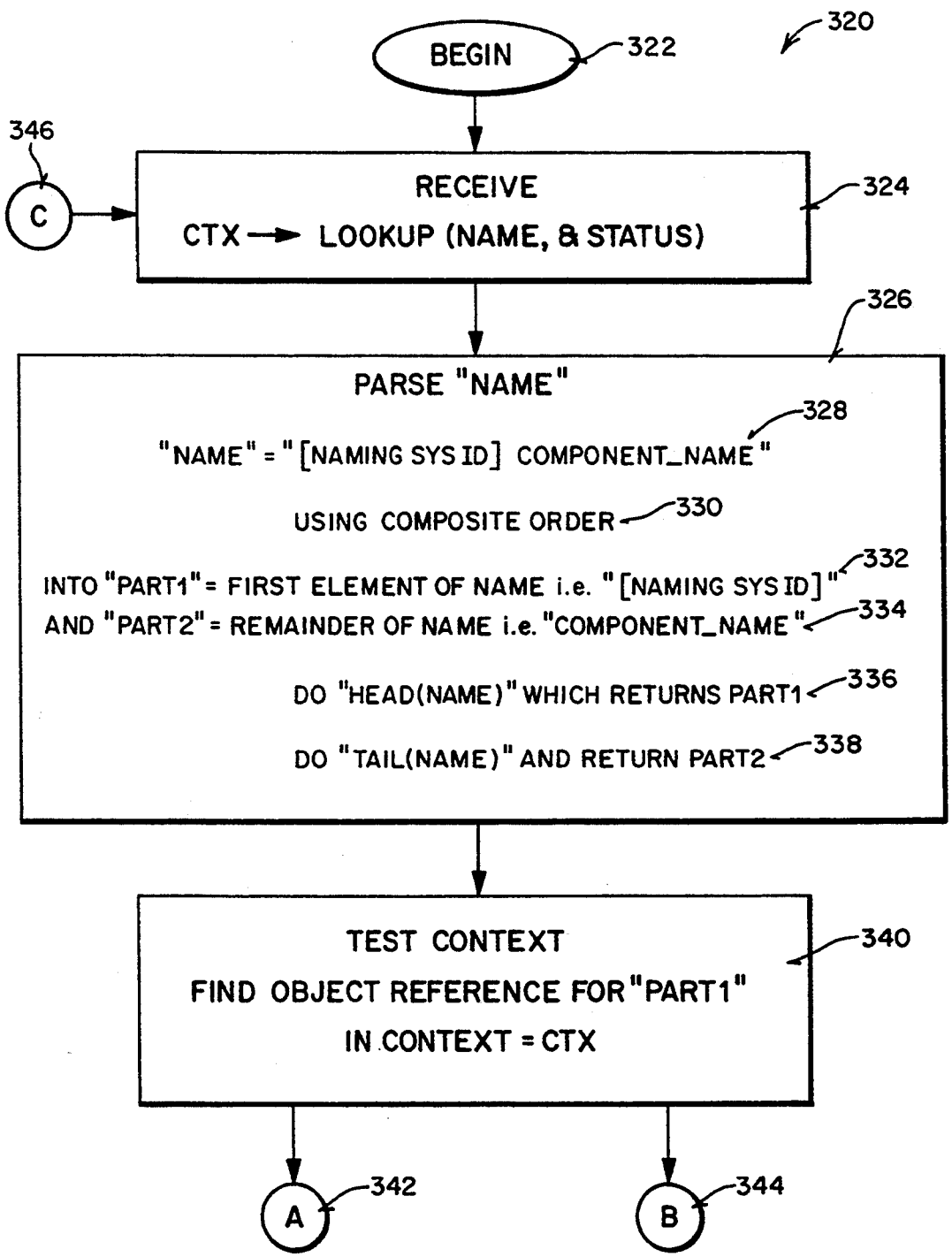
FIGS. 4 and 5 illustrate a block diagram of the Lookup operation.

The two basic name parsing operations are, "head(Name)" that returns the first atomic component of "Name", and "tail(Name)" that returns the remainder of "Name" after "head(Name)" is removed. For example, in parsing the name "user/John.Smith/foo" the operation "head (user/John. Smith/foo)" would return "user" (assuming "user" is defined as the "head" by the particular naming convention); and the operation "tail(user/John.Smith/foo)" would return "John.Smith/foo" (See Block 326 of FIG. 4, for example.

A "Name Space" is the set of all possible Names generated according to a naming convention.

A "Binding" is an association of an Atomic Name with an Object reference.

An "Object Reference" is an address or device used to invoke operations on an Object.

Figure 6:
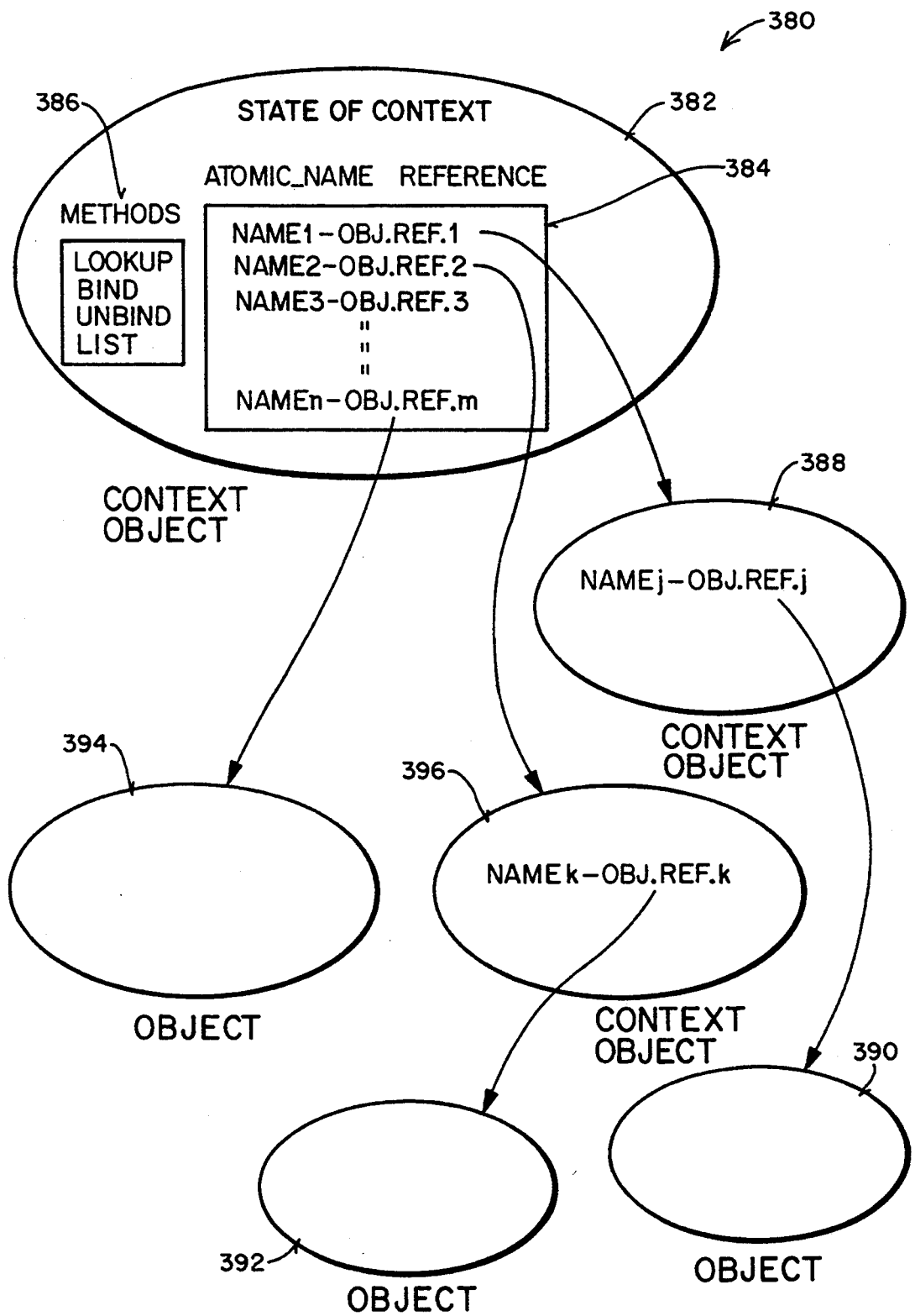
FIG. 6 illustrates the context object and relationships with other objects.

A "Context" is an object whose state is a set of bindings with distinct Atomic Names. Every Context type has an associated Naming convention. A Binding can associate any type of object to an Atomic Name. Thus a Context can contain bindings of Atomic Names to other Contexts. In this way, file systems and directory services are hierarchically structured (see FIG. 6, for example.)

Figure 1:
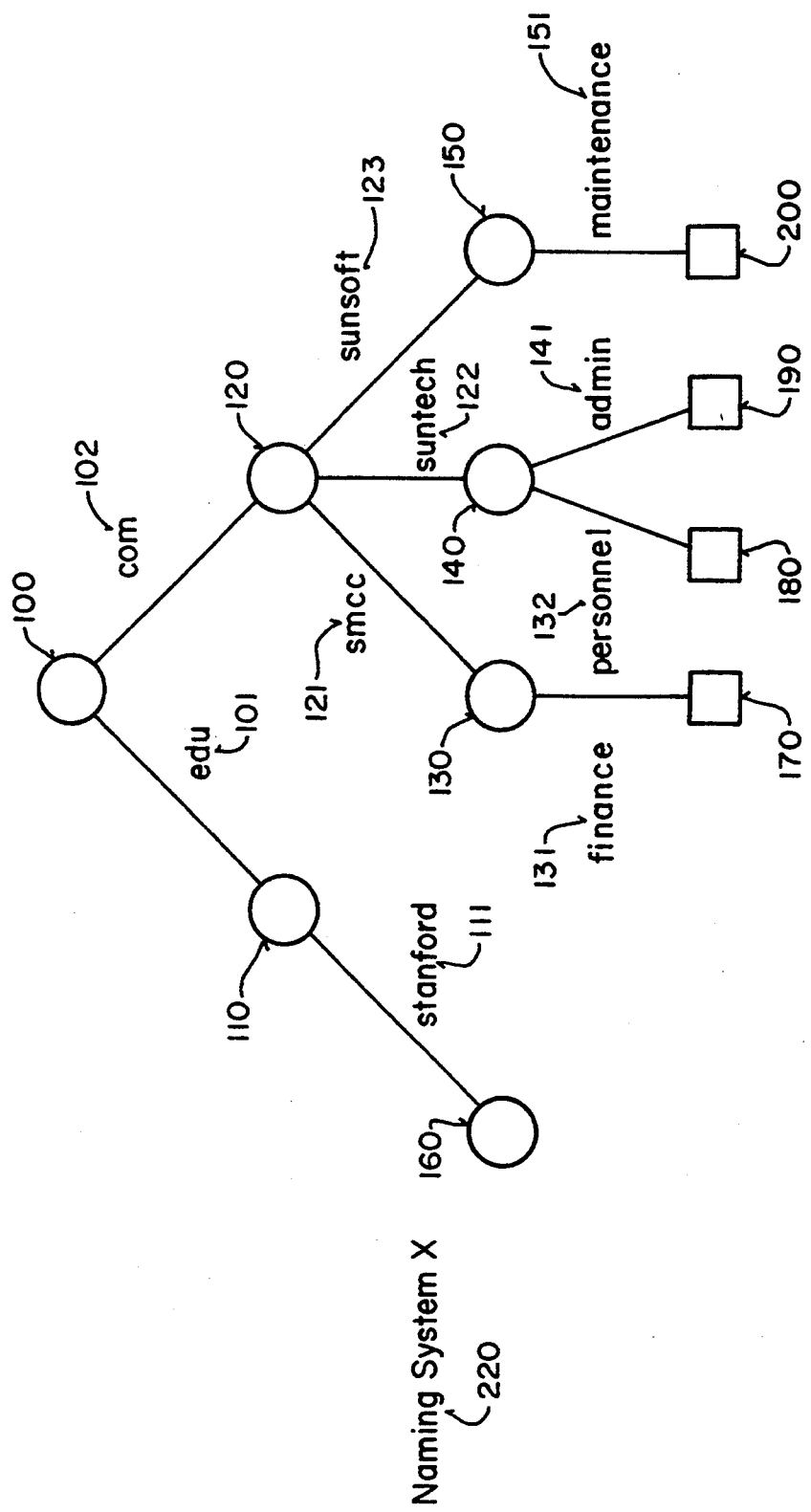
FIG. 1 is depiction of a Naming System in the prior art.

The naming operations provided by a Context include "Lookup", "Bind", "UnBind", "List", and "CreateContext". These are defined as follows for a Context denoted "c", a Name denoted "n", an Atomic Name denoted "an", and an Object reference denoted "s". An invocation of "c.LookUp(n)" is evaluated as follows: Let "s" be the Object reference bound to "head(n)" in "c". If "n" is an Atomic Name, then return "s". Otherwise, return "s.LookUp(tail(n))". For example, referring now to FIG. 1, we shall describe how this operation "c.LookUp(n)" would work in an example using an existing Naming System. FIG. 1 depicts a Naming System X of a type that can be found in the prior art. Naming System X 220 contains Context Objects 100, 110, 120, 130, 140, 150, and 160, and Objects 170, 180, 190, and 200. Context 100 contains two bindings, "com" 102 to Context Object 120, and "edu" 101 to Context Object 110. Context 120 contains three bindings, "smcc" 121 to Context Object 130, "suntech" 122 to Context Object 140, and "sunsoft" 123 to Context Object 150. Context 150 contains only one binding, "maintenance" 151 to Object 200. To resolve a Name "maintence.sunsoft.com" from Naming System X 220 in Context 100, we invoke on Context 100 the LookUp operation as follows context 100->LookUp ("maintenance.sunsoft.com")

In Context 100 the following operations are performed:

head("maintenance.sunsoft.com") which returns "com"; and tail("maintenance.sunsoft.com") which returns "maintenance.sunsoft".

Since the Context 100 knows that "com" (which was returned by the "head" operation), is bound to a reference to Context 120, and since the "tail" operation returned a non-null value (i.e. "maintenance.sunsoft"), the resolution process continues by invoking "LookUp" again but this time relative to Context 120 and with the reduced Name "maintenance.sunsoft" that was returned by "tail". So, in Context 120 the following operations are performed:

head("maintenance.sunsoft") which returns "sunsoft"; and tail("maintenance.sunsoft") which returns "maintenance".

Since the Context 120 knows that "sunsoft" (which was returned by the "head" operation), is bound to a reference to Context 150, and since the "tail" operation returned a non-null value (i.e. "maintenance"), the resolution process continues by invoking "LookUp" again but this time relative to Context 150 and with the reduced Name returned by "tail". So, in Context 150 the following operations are performed:

head("maintenance") returns "maintenance"; and tail("maintenance") returns a null value.

Since the "tail" operation returned a null value the LookUp operation terminates, returning eventually to the Client, the reference to Object 200, which Context 150 knows is bound to "maintenance". (See FIG. 6, for example.)

An invocation of "c.Bind(an,s)" adds the new binding (an,s) to "c". An invocation of "c.UnBind(an)" removes "an's" binding from "c". An invocation of "c.List()" returns the set of atomic names bound in "c". (See FIG. 6 Block 386.)

An invocation of "c.CreateContext(an)" creates a new context object "c'", and adds the new binding (an,c') to "c".

A "Naming System" is a set of context objects that can be represented by a directed graph, where each node in the graph is a context, and an arc from one node to another indicates the existence of a binding. For example, an arc from node a to node b indicates the existence of a binding (an,b) in a. A context is called a "Root Context" if every other Context in the Naming System can be named relative to the Root Context. Typically, a Naming System has a single Root Context.

It should be obvious from the above model of a Naming System, the model can be used to describe any existing Naming System. It should also be noted, however, that existing systems have their own methods for parsing names in their systems but they may be considered equivalent to the "Lookup" operations described in the present invention. The model shall now be extended to include multiple disparate Naming Systems in order to describe in detail the present invention and the presently preferred embodiment thereof.

FEDERATED NAMING SYSTEMS

A "Federated Naming System" is an aggregation of autonomous Naming Systems that cooperate through a standard interface and protocol to implement name resolution for Composite Names. The contexts in a federated Naming System can directly resolve Composite Names without intermediate customized clerks, customized agents, or customized gateways. Each member of a federated Naming System (i.e. the individual Naming Systems) has autonomy in its choice of naming conventions, administrative interfaces (such as security regulations, etc) and its particular set of operations for Name resolution.

Figure 2:
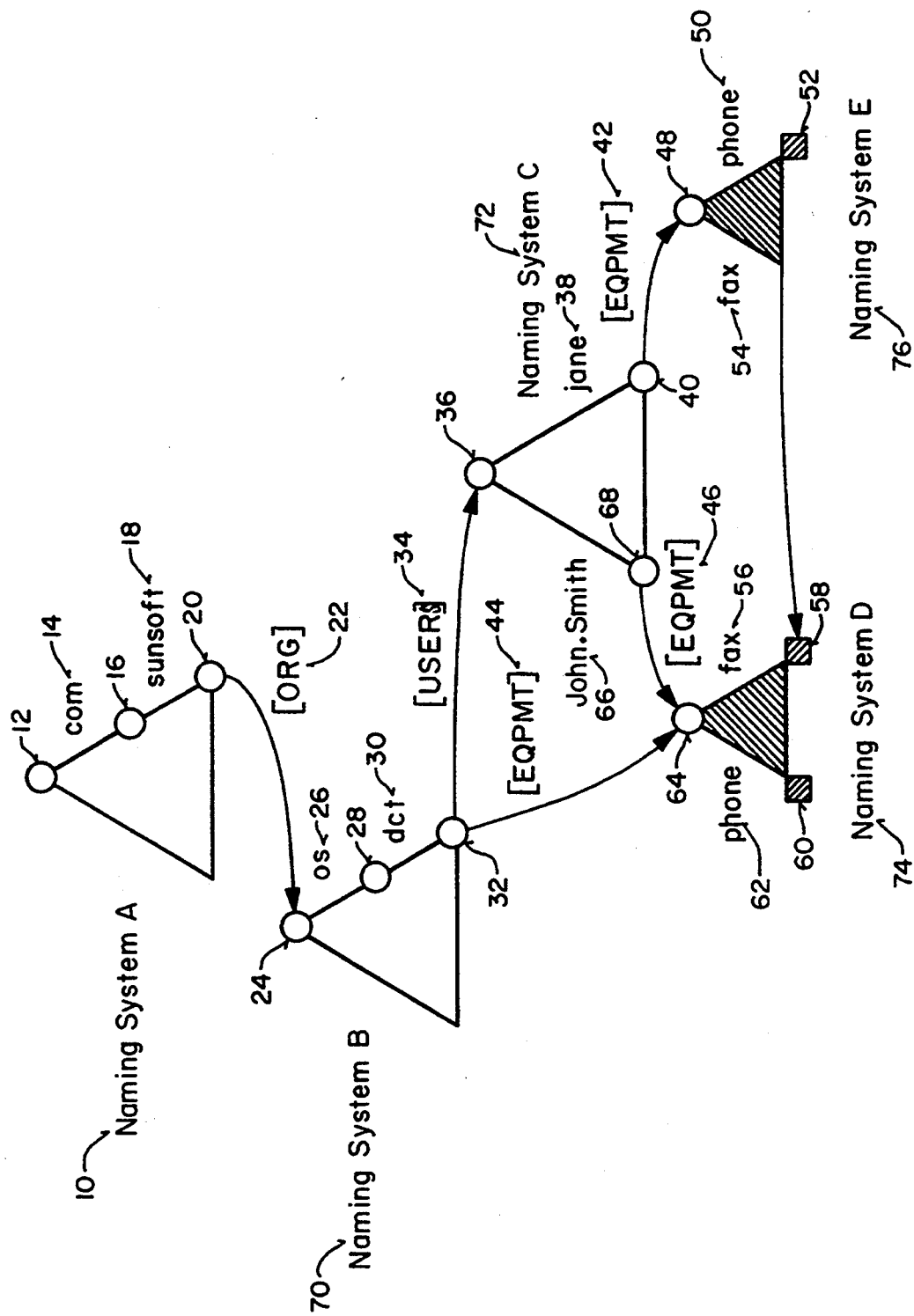
FIG. 2 is a representation of a Federated Naming System as described in this disclosure.

Referring now to FIG. 2, a Federated Naming System will be described which is representative of the type of Federated Naming System defined by the present invention. FIG. 2 shows a set of autonomous Naming Systems A 10, B 70, C 72, D 74, and E 76. Naming System A 10 consists of Contexts 12, 16, and 20; Naming System B 70 consists of Contexts 24, 28, and 32; Naming System C 72 consists of Contexts 36, 40, and 68; Naming System D 74 consists of Context 64; and Naming System E 76 consists of Context 48.

The following table shows the Name Bindings in each of the Contexts in FIG. 2.

| Naming System | Context | Bindings | |
|---|---|---|---|
| | | Atomic Name | Object |
| A 10 | 12 | com 14 | 16 |
| A 10 | 16 | sunsoft 18 | 20 |
| A 10 | 20 | [ORG] 22 | 24 |
| B 70 | 24 | os 26 | 28 |
| B 70 | 28 | dct 30 | 32 |
| B 70 | 32 | [USERS] 34 | 36 |

-continued

| Naming System | Context | Bindings Atomic Name | Object |
| --- | --- | --- | --- |
| B 70 | 32 | [EQPMT] 44 | 64 |
| C 72 | 36 | John.Smith 66 | 68 |
| C 72 | 36 | jane 38 | 40 |
| C 72 | 68 | [EQPMT] 46 | 64 |
| C 72 | 40 | [EQPMT] 42 | 48 |
| D 74 | 64 | phone 62 | 60 |
| D 74 | 64 | fax 56 | 58 |
| E 76 | 48 | fax 54 | 58 |
| E 76 | 48 | phone 50 | 52 |

The Bindings determine the state of each Naming System 10, 70, 72, 74, and 76. The Naming Systems are autonomous in that the naming conventions chosen for each Naming System do not depend on any other. In the example of FIG. 2, Naming System A 10 uses Atomic Names ordered right-to-left with corresponding Contexts ordered from bottom-to-top. Naming System A 10 also uses the "." character as a delimiter. Thus, the name of Context Object 24 is "[ORG].sunsoft.com". Similarly, in Naming System B 70, the Name of Context 36 is "os:dct:[USERS]". Naming System B 70 has Naming conventions in which Atomic Names (i.e. "os" 26 and "dct" 30) are ordered left-to-right corresponding to Contexts from top-to-bottom, and uses the ":" character as a delimiter. In Naming System C 72, the Name of Context 64 is "John.Smith[EQPMT]". Note that "John.Smith" 66 is an Atomic Name. In Naming System D 64, Object 58 has the Name "fax" 56. Naming System D 74 has a flat Naming System in that all names are Atomic Names. Finally, also note that Object 58 also has a name "fax" 54 in Naming System E 76.

THE PREFERRED EMBODIMENT

In the preferred embodiment at this time, a federation of disparate Naming Systems is designated "The OpenFederation of Naming Systems" (hereinafter "OpenFederation").

In order for a naming system to be a member of the OpenFederation of Naming Systems, it must conform to standards on two fronts.

The Composite Name Syntax

The naming interface to the context object.

Composite Name Syntax

The OpenFederation prescribes a composition syntax for forming Composite Names from component Names from different Naming Systems. In general, the OpenFederation does not specify or restrict the syntax of the component Names from the individual Naming Systems. If there is a conflict between the composition syntax and the naming convention of an individual Naming System, the conflict is resolved by "escaping" such Names.

In the preferred embodiment, the syntax of Composite Names is specified using a pseudo-Backus Naur Form (BNF) as follows:
   composite_name: {component}*
   component: namingsystem_id_part component_name
   namingsystem_id_part: '['namingsystem_id ']'
   namingsystem_id: {any char except ']'}+

Figure 3:
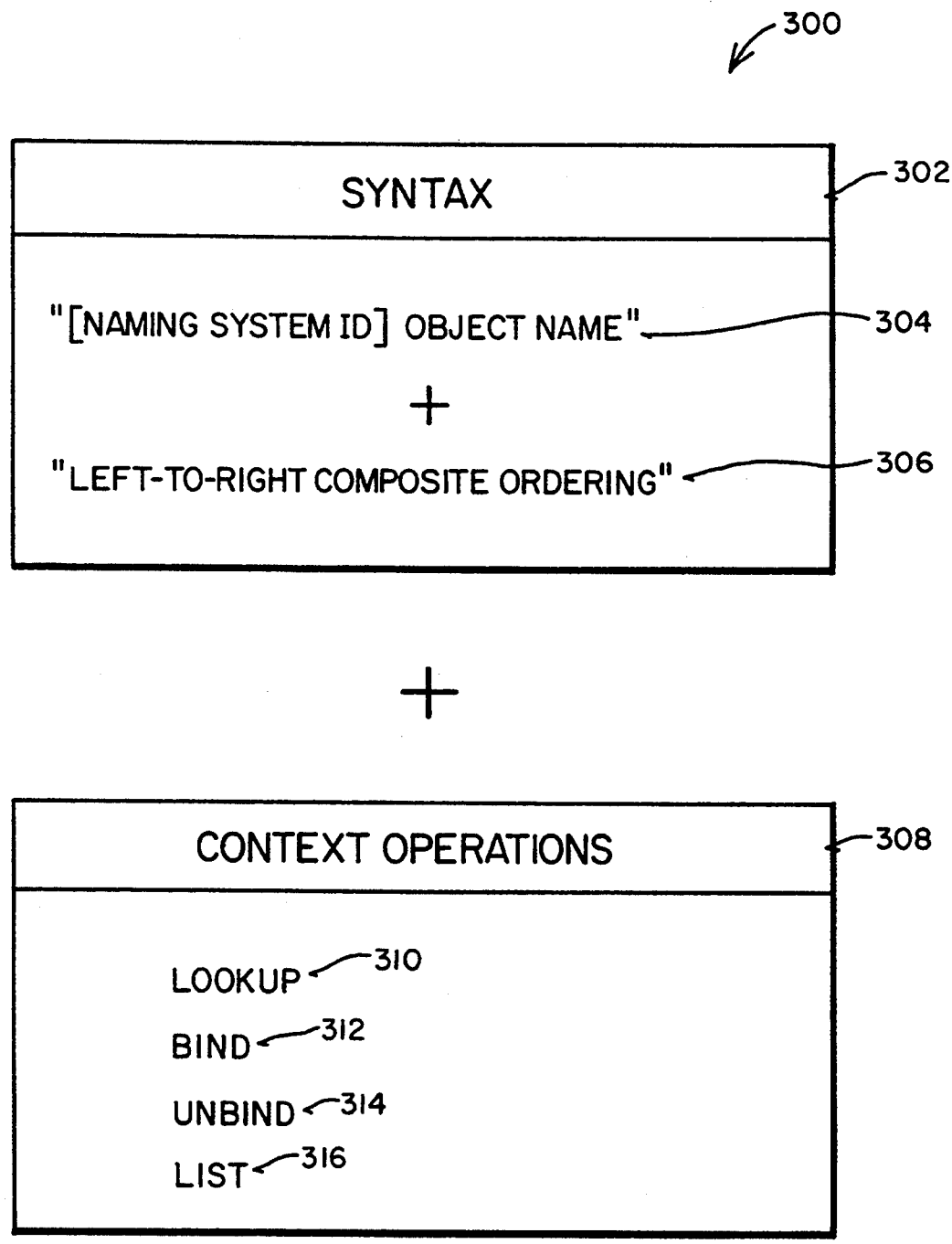
FIG. 3 illustrates the requirements of the Federated Naming System.

The Composite Name is specified by ordering the components in left-to-right order. Resolution in the OpenFederation proceeds in this order. Naming System identifiers (namingsystem_ids) separate components of a Composite Name belonging to different Naming Systems. (This is shown in FIG. 3.)

The syntax of "component_name" may vary among Naming Systems. For example, a component Name from an DNS Naming System is defined by the DNS naming syntax.

An example of a Composite Name is
   "[dns]eng.sun.com[user]jsmith"
which consists of two components: "[dns]eng.sun.com" and "[user]jsmith".

The portions "[dns]" and "[user]" are Naming System identifiers. "eng.sun.com" and "jsmith" are component Names in the respective Naming Systems.

The Naming System identifiers in Composite Names serve several purposes: (1) as separators between successive components, and (2) in some cases as indicators of the syntactic rules for parsing each component.

Separators between successive components are needed in order to be able to unambiguously separate two components in Naming Systems with conflicting Name syntaxes. The ability to separate such components is necessary to administer the OpenFederation Composite Name resolution scheme at the federation-level given that we wish to handle arbitrary component Naming Systems.

In addition, it is often useful to be able to parse a Name into components without requiring Name resolution. A Composite Name syntax with such separators allows this. To allow independence from a specific Name representation, in the presently preferred embodiment, OpenFederation prescribes a standard set of operations to be used for breaking Composite Names into components. These operations are "Equivalent", "Coun_Components", "Concatenate", "Split", "Get_Suffix", "Copy", and "Free", all of which are described below.

Although a Client can parse a Composite Name into its component Names, in general, clients may not be able to parse the component Names into Atomic Names. For example, given a name like "[org]uw[dt]a|b.c" taken relative to a context "ctx", a client may not be able to break up the component "a|b.c" without invoking a parsing operation provided by the context object obtained by "ctx.LookUp("[org]uw[dt]")".

However, certain Naming System identifiers will be indicators of the syntax of the component Naming System. In the preferred embodiment, OpenFederation will define a set of well-known Naming System ids that are reserved for certain common Naming Systems, like DNS, X.500, and Unix pathnames. Clients will have access to certain standard parsing methods for these well-known Naming Systems. Thus clients will be able to parse those components of a Name that bear well-known Naming System ids.

OpenFederation Operations on Composite Names

In the preferred embodiment, a number of standard operations on Composite Names are implemented for use by clients and by OpenFederation Context Objects for composing, decomposing, and comparing Names. These operations are defined as follows. However, in order to aid in the description of the operations, the following terms are used to refer to parts of Composite Names:

A "prefix" of a Composite Name is any ordered subsequence of consecutive components from the beginning of a Composite Name. A "suffix" of a Composite Name is any ordered subsequence of consecutive components from the terminal end of a composite Name.

Equivalent

In the preferred embodiment, an operation "Equivalent" is defined as follows:

boolean equivalent(IN composite_name_t cname1, IN compo_name_t cname2); Usage: if( equivalent(cname1, cname2)) ...

If this predicate returns "true" then, the two names "cname1" and "cname2" are syntactically equivalent. The converse is not guaranteed—if the predicate returns "false", the two names may still be equivalent.

Equivalence of two names is sufficient to guarantee that, relative to any one context, the two names cannot refer to different objects.

In general, without resorting to resolution, only exact equality will assure equivalence - however it may be possible in the case of well-known Naming Systems, to determine equivalence accurately without resolution.

This function is useful whenever the client wants to determine whether a given composite name is syntactically the same as another composite name about which it already has information. For example, for caching which helps improve efficiency, "Equivalent" could be used to check whether a given name is already in the cache.

Other operations implemented for the preferred embodiment are as follows:

Count_Components integer count_components(IN composite_name_t cname); Usage: num_comp=count_components(cname); Returns the number of components in a given composite name, "cname".

Concatenate composite_name_t concatenate(IN composite_name_t head, IN composite_name_t tail); Usage: head_plus_tail=concatenate(head, tail); Returns a new composite name consisting of the ordered list of components from "head", followed by those in "tail".

Split split(IN composite_name_t cname, IN integer i, OUT composite_name_t head, OUT composite_name_t tail); Usage: split(three_part_name, 2, &head, &tail); Returns the ordered list of "i" components from "cname" in "head", and the rest ordered in "tail".

This procedure is useful when you know the prefix of a name and want to construct a new name using either the prefix or suffix of the same name. It is probably most useful for extracting the first component or the last component of a composite name.

Get_Suffix composite_name_t get_suffix(IN composite_name_t cname, IN composite_name_t pname) Usage: whats_left=get_suffix(whole_name, prefix_of ) Returns the ordered subsequence of components from "cname" that do not appear in "pname" if "pname" is prefix of "cname". Operation fails if "pname" is not a prefix of "cname".

This procedure is useful in caching, for example, where we may want to determine whether there is cached info,marion about prefixes of a composite name, or the whole composite name.

Copy composite_name_t copy(IN composite_name_t cname); Usage: new_name=copy(cname); Returns a copy of the given composite name "cname".

Free free(IN composite_name_t cname); Usage: free(cname); Release the storage used to hold "cname".

A Naming System that wishes to join the OpenFederation federation must adhere to the Composition syntax described above. The Naming System must also provide operations similar to those defined above for "Equivalent", "Count_Components", "Concatenate", "Split", "Get_Suffix", "Copy", and "Free". (See FIG. 3.)

Using this Composition Syntax and the related operations, the standard Naming interface for Contexts in the preferred embodiment OpenFederation is now described.

The OpenFederation Naming Interface

In the preferred embodiment, OpenFederation defines a context interface that includes the "OpenLookUp", "OpenBind", "OpenUnbind", and "OpenList" operations. The interface syntax and semantics are described as follows.

Interface Definition

The "interface definition" in the present embodiment, in terms of pseudocode, is defined as follows:

```
typedef string<unbounded> Composite Name;
const Name NULLNAME=<0>;
typedef sequence <Composite Name,UNBOUNDED> NameList;
const int BIND_SUPERSEDE=0X1
interface Context {
  typedef enum (
    OK, NOT_CONTEXT, NOT_FOUND, NO_PERMISSION,
    ALREADY_BOUND, ILLEGAL_NAME, UNSUPPORTED_OP
  ) statuscode;
  typedef struct {
    statuscode err;
    Composite Name where, rest;
    objref_t ref;
    boolean precisely;
  } status;
  objref_t OpenLookup( in Composite Name name, out status* );
  void OpenBind( in Composite Name name, in objref_t
    objref, in int flags, out status* );
  void OpenUnbind( in Composite Name name, out status* );
  NameList OpenList( in Composite Name name, out status* );
};
```

Requirements

In the preferred embodiment, every OpenFederation Context must provide full support for the "OpenLookup" operation that we describe below. It need not support the "OpenBind", "OpenUnbind", and "OpenList" operations to the extent described. In the case that a terminal context does not support the desired operation, it must return the status code "UNSUPPORTED_OP" and the remaining status information, as described below.

Names

In the preferred embodiment, all of the operations supported by OpenFederation Context objects take Composite Names as arguments. A composite name is interpreted relative to the context object on which the operation is invoked.

The use of "NULLNAME" as a name has a special interpretation. When supplied to a context object, it is a name for that context itself.

In all of the following, "ctx" is an OpenFederation context object. In the preferred embodiment, the following are the required operations.

Lookup

Figure 5:
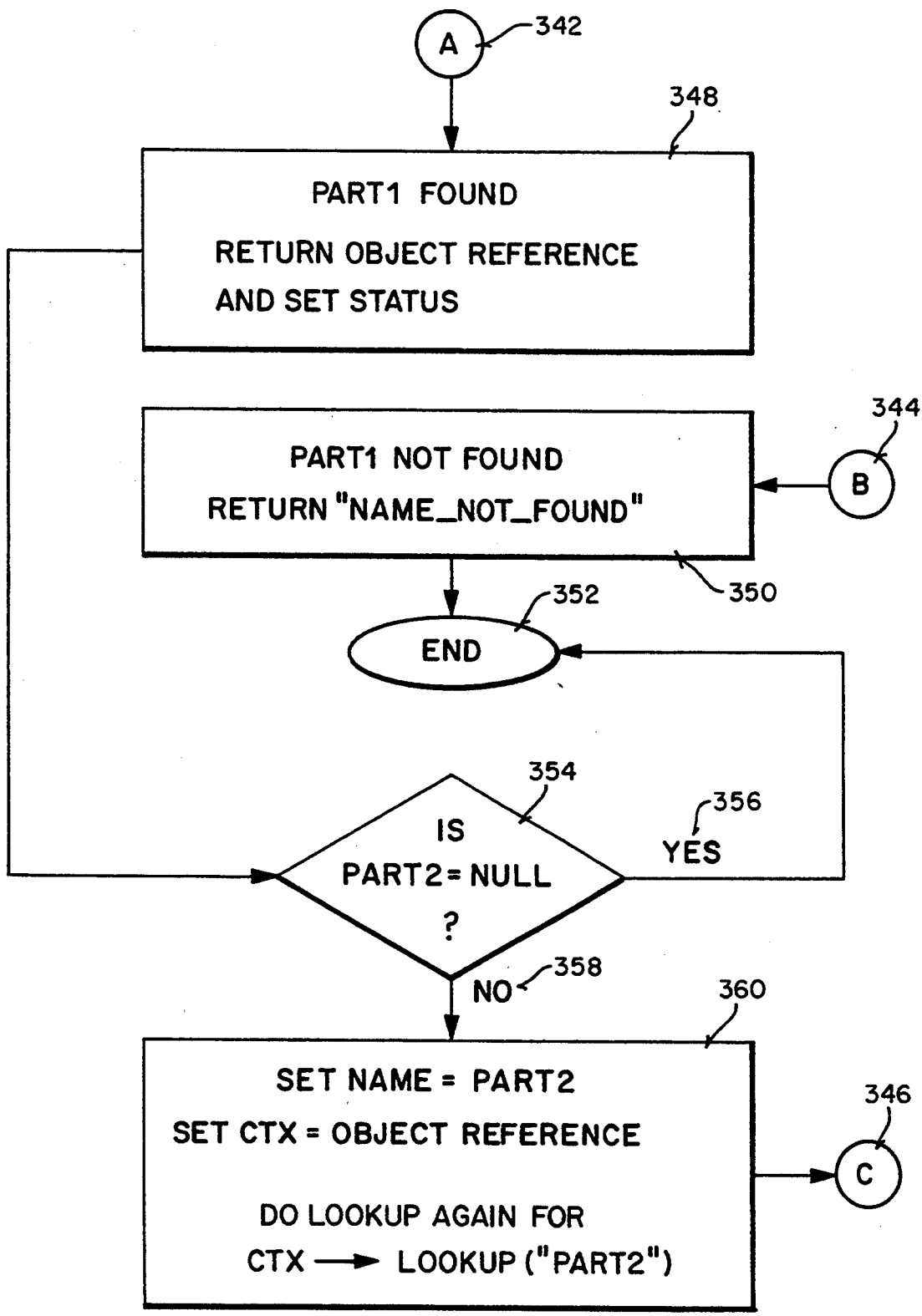

Usage: objecet=ctx->OpenLookup(name, &status); returns a reference to the object named by the Composite Name "name" relative to the context "ctx". If "name" is equal to "NULLNAME", "OpenLookup" returns an object reference to the object "ctx". (See FIG. 4 and 5.)

Bind

Usage: ctx->OpenBind(name, objref, flags, &status); binds the terminal atomic part of the supplied Name "name" to the supplied object reference. The binding is made in the penultimate context in "name", relative to "ctx". If "name" is Atomic, the binding is done in the context "ctx". Unless the "BIND_SUPERSEDE" flag is set, the binding must be exclusive. That is, the operation returns an error code in "status" (see the section "Status Information" below) and the operation fails if the terminal Atomic part of the provided Name is already bound. If the "BIND_SUPERSEDE" flag is set, then the bind operation will overwrite any existing binding.

Unbind

Usage: ctx->OpenUnbind (name, &status); removes the binding of the terminal Atomic part of "name" from the penultimate context of "name" relative to "ctx".

List Usage: listing=ctx->OpenList(name, &status); returns a list (of type "NameList") of all of the names that are bound in the context named by "name" taken relative to "ctx".

Status Information

In the preferred embodiment of the federation OpenFederation, Status Information is handled in the following manner.

Status Structure

Each of the operations returns a parameter "status", which is a structure (i.e. a set of data). The field "status.err" contains a "status code" of type "statuscode". The interpretation of the remainder of the status structure depends on this status code. Except in those cases specified differently below, the interpretation is as follows: "status.where" contains the name of an intermediate context up to which the operation proceeded normally. (The name in "status.where" is interpreted relative to the "returning" context. That is, if a context "ctx" obtains the status information from a lower-level context service, then "ctx" must revise "status.where" so that it names the same object relative to "ctx".) The field "status.ref" will always be an object reference to the context named by "status.where"; "status.rest" will contain a name, which relative to "status.where" is equivalent to the input name. If the boolean field "status.precisely" is true, then the returning context guarantees that "status.where" names precisely the context in which an error occurred. If "status.precisely" is false, the returning context guarantees only that "status.where" names an intermediate context up to which no error occurred during that operation, but not necessarily the context in which the error occurred.

Status Codes

In the preferred embodiment, the following Status Codes are defined:

"OK"—the operation succeeded. For all operations except "OpenList", "status.where" will contain the penultimate prefix of "name", (so "status.rest" will contain the terminal atomic part of the input parameter "name"). For the "OpenList" operation, "status.where" will be the entire "name", and "status.rest" will be "NULLNAME". For all operations "status.precisely" will always be "true" on an "OK" return. "NO_PERMISSION"—permission was not granted for some required operation either at a terminal or intermediate context.

"ALREADY_BOUND"—(this code applies to the operation "bind" only), the terminal atomic name had an existing binding in the penultimate context, and the "BIND_SUPERSEDE" flag was not set.

"NOT_CONTEXT"—either the OpenList operation was invoked on an object that was not a context, or the resolution of the supplied name reached a non-context object before reaching the penultimate context.

"NOT_FOUND"—the terminal atomic name was not bound in the penultimate context or resolution could not proceed beyond some intermediate context because the next atomic name requiring resolution was not bound.

"ILLEGAL_NAME"—some component of the name was not a well-formed name in the associated naming system.

"UNSUPPORTED_OP"—the operation invoked was not supported by the terminal context. This can happen on "OpenBind", "OpenUnbind", and "OpenList" operations. As indicated above, all federation members, by definition must support the CompositeLookup operation (in the preferred embodiment "OpenLookUp"), but may choose not to support the operations of "OpenBind", "OpenUnbind", and "OpenList". If they do not support these operations, then this Status Code would be returned whenever one of those operations is invoked. In the preferred embodiment, all of these operations are implemented.

Exceptions

In the preferred embodiment, an OpenFederation context may raise an exception if it is unable to return normally with a status described accurately by one of the status codes. Normally these exceptions would be masked by intermediate OpenFederation contexts before reaching a caller outside the OpenFederation federation. It is therefore required that federation members have a minimal recovery procedure that every federation context must follow before allowing an exception to proceed to its immediate caller. In the preferred embodiment, every OpenFederation context must follow such a minimal recovery procedure before allowing an exception to proceed to its immediate caller, upon receipt of, for example, the following status code:.

"_FAILURE"—an unexpected failure prevented normal return.

As can be seen from the above description of the preferred embodiment of a federation of disparate naming systems, the minimal requirements for joining a similar federation include:

1. An agreement on the general definition of a Composite Name syntax for use by the federation. The composite name will be a sequence of one or more names, $n_1, n_2, \ldots, n_k$ from possibly disparate Naming Systems. The preferred Composition syntax is as described above for the OpenFederation embodiment. Other composition rules may be used which are equivalent.

2. A set of operating means for performing the function of Composite Name lookup at a minimum. It is also suggested that the operations of binding, unbinding, and listing names also be implemented.

From the above it can be seen that new members can be added to the federation without impact to the existing members. That is, adding a new Naming System to an existing Federation only requires that a reference to a Context in the new Naming System be bound to a Name in a Context in one or more of the prior member Naming Systems.

Thus it can be seen that in such a system any number of disparate naming systems may be federated with minimal implementation cost to the individual systems and clients, and that no intermediate customized agents or gateways are required, resulting in better performance and fewer fault-tolerance issues.

As this invention may be embodied in several forms without departing from the spirit of the essential characteristics thereof, the present embodiment is therefore illustrative and not restrictive, since the scope of the invention is defined by the appended claims rather than by the description preceding them, and all changes that fall within the metes and bounds thereof are therefore intended to be embraced by the claims.

I claim:

1. In a distributed computing environment, an apparatus for a federated naming system which can resolve a composite name composed of any number of disparate naming systems, said apparatus comprising:
   a) a plurality of arbitrary naming systems, each of said naming systems comprising a plurality of names, cash name being comprised of one or more atomic names, said atomic names being pointers to corresponding objects, each of said naming systems having names with syntax unknown to other naming systems, thereby permitting a new naming system to be added to said distributed computing environment without having to change any other associated naming system;
   b) a composite name, comprising a sequence of one or more names from different naming systems which are connected as a sequence of components, each component comprising a naming system identification symbol and a name from said naming system, said naming system identification symbol being uniquely related to one of said plurality of arbitrary naming systems, said sequence of components having an arbitrary number of said components corresponding to said one or more names;
   c) a first lookup device for resolving said composite name into said composite name's corresponding parts by returning a head name and a tail name to a request that said composite name bc resolved, and if said taft name is a non-null value said head name is openfive to point to a context where said tail name can be further resolved, and repeating said resolving operation iteratiyely until said tail name returned is a null value at which time a location of an object designated by said composite name has been determined; and
   d) a second lookup device which is local to an individual one of said plurality of arbitrary naming systems which is used to resolve names unique to said individual naming system, into associated atomic names and to return a pointer to an object designed by an atomic name therby providing to said first lookup device a resolution for a name in said individual naming system.

2. The apparatus claimed in claim 1 wherein said first lookup device comprises a third logic mechanism operative in a first context to provide an object reference if the composite name is an atomic name; said third logic mechanism being operative to provide a reference to a context object in another naming system a tail of the composite name, if the composite name refers to a context object in said another naming system; and said third logic mechanism being operative to provide a tail of said composite name within a naming system in said first context.

3. The apparatus defined in claim 2 wherein said third logic device is operative to perform operations of composite name binding, unbinding, and listing names.

4. The apparatus defined in claim 3 wherein the apparatus is operative in an object oriented distributed computing system.

5. In a distributed computing environment, a computer implemented method for a federated naming system which can resolve a composite name composed of any number of disparate naming systems, said method comprising the steps of:
   a) identifying a plurality of arbitrary naming systems, each of said naming systems comprising a plurality of names, each name being comprised of one or more atomic names, said atomic names being pointers to corresponding objects, each of said naming systems having names with syntax unknown to any other naming system, thereby permitting a new naming system to be added to said distributed computing environment without requiring changes to any other existing naming system in said environment;
   b) identifying a composite name, comprising a sequence of components, each component comprising a naming system identification symbol and a name from said naming system, said naming system identification symbol being uniquely related to one of said plurality of arbitrary naming systems, said sequence of components having an arbitrary number of said components wherein said composite name is a sequence of nested addresses;
   c) using a first lockup device, resolving said composite name into said composite name's corresponding parts by returning a head name and a tail name to a request that said composite name be resolved, and if said tail name is a non-null value stud head name is operative to point to a context where said tail name can be further resolved, and repeating said resolving operation iteratively until said tail name returned is a null value, at which the a location of an object designated by said composite name has been determined; and
   d) using a second lookup device which is local to an individual one of said plurality of arbitrary naming systems which is used to resolve names unique to said individual naming system into associated atomic names and to return a pointer to an object designated by an atomic name providing to said first lookup device a resolution for a name in said individual naming system.

6. The method described in claim 5 wherein the step of resolving the composite name comprises the steps of establishing a composite lookup operation which is operative in a first context to provide an object reference if the composite name is an atomic name, said composite lookup operation being operative to provide a reference to another naming system context and a tail of the composite name, if the composite name refers to another naming system.

7. In a distributed computing system, a computer implemented method for a federated naming system comprising the steps of:
   a) providing a plurality of naming systems, each of said naming systems comprising a plurality of names, each name being comprised of one or more atomic names, said atomic names being pointers to corresponding objects, each of said naming systems having names with syntax unknown to any other naming system, thereby permitting a new naming system to be tided to said distributed computing system without requiring any changes in any other naming system in said computing system;

b) combining names from said naming systems into a composite name by
   i) designating a first prefix name represented by a naming system identification symbol to identify a first naming system;
   ii) appending said first prefix name to a name in said first naming system, said name and appended first prefix name designated a first naming system component name; and c) using a left-to-right order for combining said first naming system component name to a sequence of similar naming system component names corresponding to an arbitrary number of said plurality of naming systems to form said composite name; and d) providing a plurality of operations for operating on composite names including using a first lookup operation to resolve a composite name into a reference to an object harnell by said composite name relative to a specified context, by returning a head name and a tail name to a request that said composite name be resolved, and if said tail name is a non-null value said head name is operative to point to a context where said tail name can be further resolved, and repeating said resolving operation iteratively until said tail name returned is a null value, at which time a location of an object designated by said composite name has been determined, and using a second lookup device which is local to an individual one of said plurality of arbitrary naming systems which is used to resolve names unique to said individual naming system into associated atomic names and to return a pointer to an object designated by an atomic name providing to said first lookup device a resolution for a name in said individual naming system.

8. The method as recited in claim 7 wherein said step of providing a plurality of operations for operating on composite names comprises the additional steps of:

a) providing a bind operation for binding an atomic name portion of a component name to an object reference in a context, said object reference being supplied as a parameter in an invocation of said bind operation and said context being a context of a naming system to which said component name belongs;

b) providing an unbind operation for removing a binding of an atomic name portion of a component name to an object reference from a context; and c) providing a list operation for providing a list in a specified context, of all names and the corresponding object references.

9. A computer system comprising:

a) a plurality of naming systems, each of said naming systems having a naming syntax which is unknown to any other naming system, thereby permitting a new naming system to be added to said computer system without requiring changes in any existing naming system, each naming system comprising:
   i) a plurality of names, each name being comprised of one or more atomic names, said atomic names being pointers to corresponding objects;
   ii) a first lookup device for resolving a composite name and operative to return a head name and a tail name in response to any request for a name to be resolved, and if said tail name is a non-null value said head name is operative to point to a context where said tail name can be further resolved, and repeating said resolving operation iteratively until said tail name returned is a null value, at which time a location of an object designated by said composite name has been determined; and
   iii) a second lookup device for resolving a name unique to said naming system into said name's corresponding atomic names and to return a pointer to an object designated by at least one said corresponding atomic name; and b) a composite name created by combining a first name from a first naming system with a second name from a second naming system by attaching a prefix to each of said first and second names, said prefix designating said corresponding first or second naming system, and combining an arbitrary number of said naming system identifier prefix and naming system name combinations in a left-to-right order corresponding to a hierarchy of said naming systems wherein said composite name is a sequence of one or more names which constitute an address of a particular object.

* * * * *